Nov. 29, 1932.   E. G. GUNN   1,889,093
BRAKE
Filed Sept. 13, 1928   2 Sheets-Sheet 1

Nov. 29, 1932.  E. G. GUNN  1,889,093
BRAKE
Filed Sept. 13, 1928   2 Sheets-Sheet 2
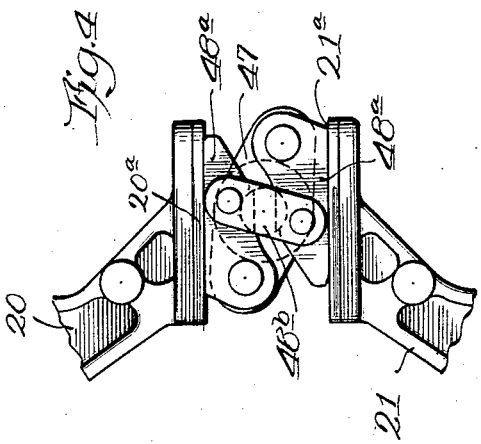
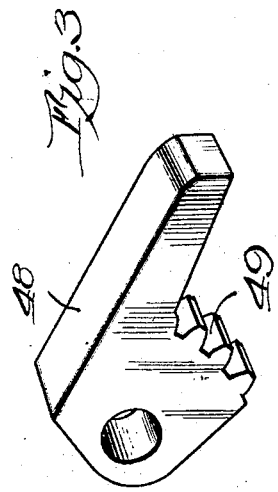
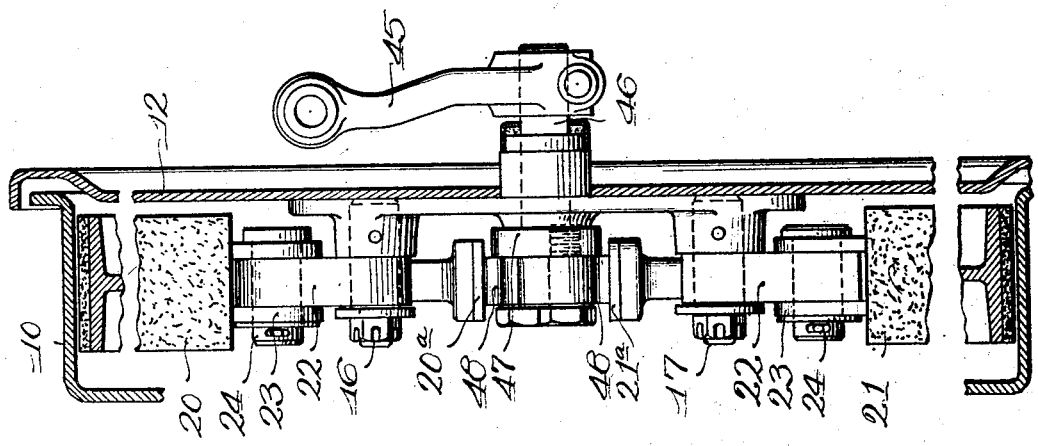
Inventor,
Earl G. Gunn Patented Nov. 29, 1932

1,889,093

UNITED STATES PATENT OFFICE

EARL G. GUNN, OF RACINE, WISCONSIN, ASSIGNOR TO THE NASH MOTORS COMPANY, OF KENOSHA, WISCONSIN, A CORPORATION OF MARYLAND

BRAKE

Application filed September 13, 1928. Serial No. 305,630.

This invention relates to improvements in brake mechanism for motor vehicles, and more particularly to internal shoe brakes having a servo action in both directions of rotation of the wheel.

The principal object of the invention is to provide a simple and more efficient construction for brakes of this character wherein the shoes may position themselves properly relative to the brake drum when the wheel is rotated in either direction, so as to eliminate many of the objectionable features existing in present constructions.

In carrying out my present invention I utilize a principle of construction broadly disclosed in a copending application filed September 6, 1928, and bearing Serial No. 304,244, and relating to a brake having servo action in one direction, in which the separate shoe sections are each supported at their anchored end by means of a double hinged link which permits limited radial and pivotal movement of said sections whereby the servo action is retained, but eliminates the danger of excessive localized pressures on the shoe sections due to improper positioning thereof when brought into engagement with the drum. In the present invention, I apply a similar principle of operation to a brake having servo action in either direction of rotation.

The invention may best be understood by reference to the accompanying drawings.

Figure 2 is a detailed side view of the brake shown in Figure 1,

Figure 3 is an enlarged detail showing one of the members of the brake applying equalizers, Figure 4 is a view showing a modified form of brake applying equalizer.

Figure 1:
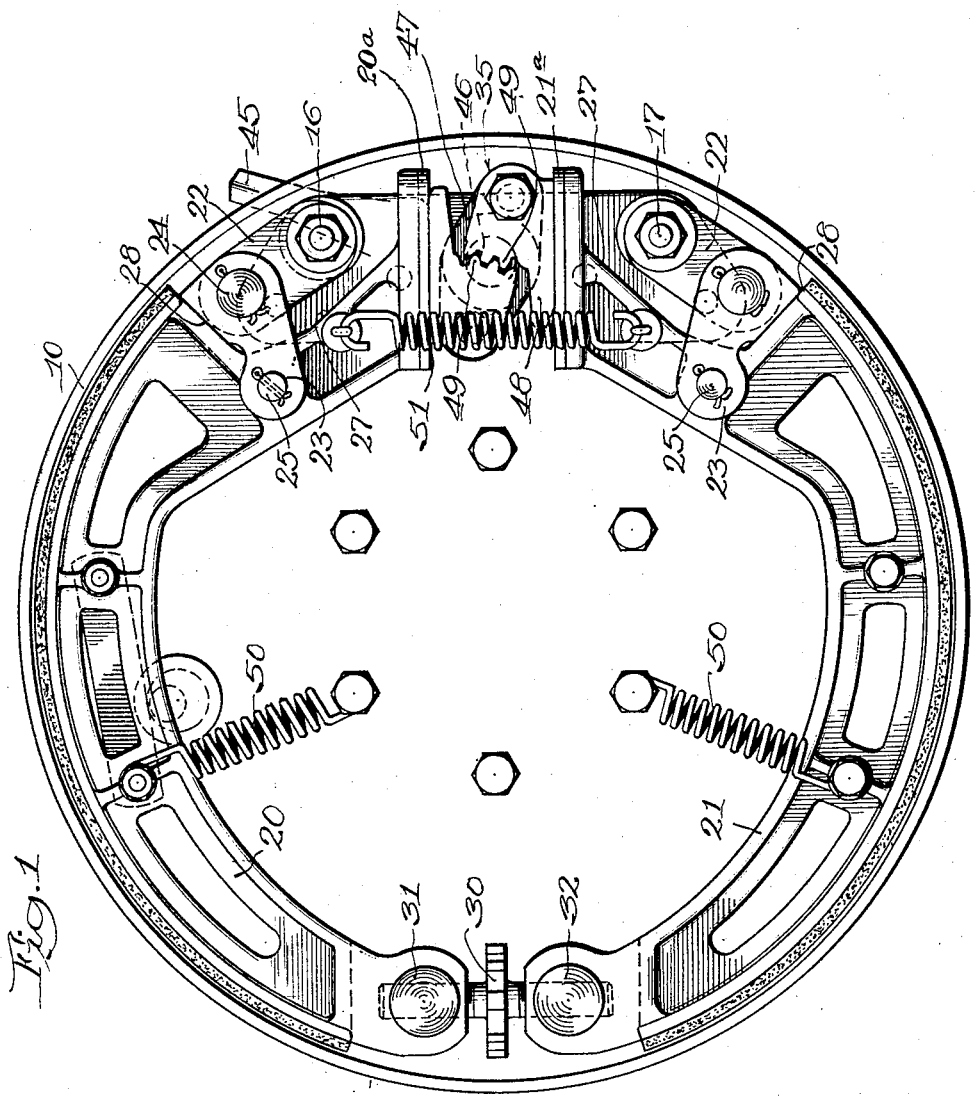
Figure 1 is a face view of a brake constructed in accordance with my invention.

Referring now to details of the drawings, the brake drum 10 is carried by the wheel in the usual manner and a backing plate 12 is mounted on the wheel spindle (not shown), having the braking mechanism carried thereon.

The braking mechanism shown herein comprises two shoes 20 and 21 of similar construction but arranged in reversed position relative to each other so as to permit servo action in either direction of rotation of the wheel, as will presently appear.

A pair of brake anchor lugs are mounted in spaced relation on the backing plate 12. The anchor lug 16 serves the shoe 20 and the anchor lug 17 similarly serves the shoe 21. Since the construction of the shoes and connecting means to respective anchors are similar excepting that they are disposed in reversed relation to each other, a description of the one will serve for the understanding of both.

The connecting and supporting means between one of the anchors in its respective shoe as for instance, the anchor 16 and shoe 20, consists of a link 22 pivotally connected at one end to the anchor lug 16 and extending in a generally tangential relation to the drum, where it is pivotally connected to a second link 23 by means of a pin 24. The second link 23 extends in a generally radial direction toward the axis of the wheel and is connected by pin 25 to the shoe 20 at a point somewhat removed from the brake drum 10.

The outer side of the shoe 20 adjacent the anchor has a cutaway portion 27 permitting freedom of movement of the link 22 but having a shoulder extending radially of the drum against which a flattened portion 28 of link 25 is adapted to engage in certain positions of the brake mechanism as will hereinafter more fully appear.

The shoe 21 is, as already suggested, provided with similar connecting links 22 and 23 and associated parts to which the same numerals have been applied.

The ends of the shoes 20 and 21 opposite the anchors are connected by turn buckle 30 with right and left hand threads passing through pivot pins 31 and 32 at adjacent ends of the shoes 20 and 21 respectively.

The shoes are normally maintained in released position by means such as tension springs 50, 50, connecting intermediate portions of each of the shoes to the backing plate 12, and the spring 51 connected between ends of the shoes near their thrust plates 20a and 21a as clearly shown in Figure 1.

The brake is applied by spreading of an equalizer member indicated generally at 35, against thrust plates 20a and 21a on the anchored ends of the shoes 20 and 21.

In the form shown in Figures 1 and 2, the brake equalizer device 35 is operated by a lever 45 on the outside of the backing plate 12, connected to the shaft 46 extending through the backing plate and having a cross arm 47 thereon. A pair of equalizer links 48, 48, are pivotally mounted at opposite ends of the cross arm 47, said equalizer links being each provided with segmental portions 49, 49, which mesh with each other on a pitch line co-incident with the axis of the operating shaft 46 as clearly shown in Figure 1. The arrangement is such that by rotation of the operating shaft 46 the equalizer links 48, 48, tend to be spread apart but said links may be spread more in one direction than the other, depending upon the direction of rotation of the wheel, as will now more fully be described.

The brake may be given servo action in either rotation of the brake drum in the following manner: With the brakes shown in released position as in Figure 1 the adjacent ends of the shoes are drawn together, with the part 28 of each link 23 in engagement with its respective shoe. Assuming that the drum 10 is rotated in a counter-clockwise direction relative to the braking mechanism as seen in Figure 1, the equalizer member 35 is operated so as to tend to spread the equalizer links 48, 48. Rotation of the drum will then tend to maintain the shoe 21 in engagement with its respective link 23 and through link 22 is held from rotation against the anchor 17. The shoe 21, however, may move radially through pivotal action of the link 22, and thus the shoe 21 is permitted to find its proper braking position against the brake drum. Since the spreading action of the equalizer device 35 is restrained from movement toward the anchor 17, its action is limited to a counter-clockwise direction, that is to say, in the same direction of rotation as the brake drum 10, which causes the opposite shoe 20 to be moved bodily in a circumferential direction, the angle between the links 22 and 23 connected with shoe 20 being then increased to permit this action. At the same time the adjacent end of the shoe 20 may be moved radially so as to find its proper braking position relative to the drum.

Since the turn buckle 30 is pivotally connected to the opposite ends of shoes 20 and 21 it will thus be understood that both shoe sections may reposition themselves in proper engaging position whenever the brake is applied, without danger of excessive pressure either at the toes or heels of said shoes.

When the drum is rotated in a clockwise direction, the action is reversed to that above described, in this case the shoe 20 is supported by anchor 16 through its respective links 22 and 23 while the similar links of shoe 21 are spread or opened to permit proper positioning of the shoe as before.

Adjustment of the clearance of the shoes is afforded through the turn buckle 30.

From the construction above described it will now be observed that the connecting links 22 and 23 of each of the shoes provide a hinged joint about their respective anchors which point is normally fixed, but when pressure is applied upon either of the shoes in a direction toward its respective anchor the link 22 permits the shoe to be moved radially toward the drum and automatically position itself so as to avoid excessive localized pressures which ordinarily are likely to occur in previous constructions especially at the heel or toe of the shoe. My improved construction also permits the use of more brake lining than heretofore and insures more even servo action in either direction of rotation of the wheel.

In the modified form of brake equalizer shown in Figure 4 the equalizer links 48a, 48a, are mounted on the cross arm 47 as before, but are connected together by means of an auxiliary link 48b which tends to maintain said links in parallel position but permits them to spread in either direction depending upon the direction in which the braking action is effected.

While I have illustrated and described the particular embodiment of my invention, it will be understood that I do not wish to be limited to the exact construction shown and described, but that various changes and modifications may be made without departing from the spirit and scope of my invention.

I claim as my invention:

1. In a wheel brake, a drum, a pair of brake anchors closely adjacent said drum, a servo brake system arranged circumferentially between said anchors, and means connecting each of the adjacent ends of said brake system to its respective anchor including two links, one of which is substantially tangential to the adjacent end of its brake system, and affords a stop against circumferential movement relative to its anchor, but permitting limited radial adjustment of said system relative to said drum, when the brake drum is rotated toward said anchor, and both of which links permit circumferential and radial movement of said system away from said anchor when the drum is rotated in the opposite direction.

2. In a wheel brake, a drum, two anchors, a pair of brake shoes each having means connecting their adjacent ends with one of said anchors, each of said connecting means including a circumferentially extending link and a radially extending link, said radially extending link having limited movement relative to its respective shoe when the latter is rotated toward its respective anchor but permitting radial movement of the shoe relative to the drum, and both of said links permitting circumferential and radial movement of said shoe relative to said anchor when said drum is rotated away from the latter.

3. In a wheel brake, a drum, two anchors, a pair of brake shoes each having means connecting the adjacent ends with one of said anchors, each of said connecting means including a circumferentially extending link and a radially extending link, said radially extending link having limited circumferential movement relative to its respective shoe when the latter is rotated toward its respective anchor but permitting limited radial movement of the shoe relative to the drum, and both of said links permitting circumferential and radial movement of said shoe relative to said anchor when said drum is rotated away from the latter, and means affording circumferential adjustment of the unanchored ends of said shoes relative to each other.

4. In a wheel brake, a drum, two anchors, a pair of brake shoes each having means connecting the adjacent ends with one of said anchors, each of said connecting means including a circumferentially arranged link and a radially extending link, said radially extending link having limited circumferential movement relative to its respective shoe when the latter is rotated toward its respective anchor but permitting limited radial movement of the shoe relative to the drum, and both of said links permitting circumferential and radial movement of said shoe relative to said anchor when said drum is rotated away from the latter, and means affording circumferential adjustment of the unanchored ends of said shoes including a turn buckle and a pair of pins pivoted to adjacent ends of said shoes.

Signed at Chicago, Ill. this 23rd day of August 1928.

EARL G. GUNN.